United States Patent
Li et al.

(10) Patent No.: US 10,014,912 B2
(45) Date of Patent: Jul. 3, 2018

(54) METHOD AND WIRELESS DEVICE FOR MONITORING A DOWNLINK CONTROL CHANNEL

(71) Applicant: Telefonaktiebolaget LM Ericsson (publ), Stockholm (SE)

(72) Inventors: Shaohua Li, Beijing (CN); Erik Eriksson, Linkoping (SE); Rui Fan, Beijing (CN); Zhiheng Guo, Beijing (CN); Jinhua Liu, Beijing (CN); Xinghua Song, Beijing (CN)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 105 days.

(21) Appl. No.: 15/023,666

(22) PCT Filed: Jun. 26, 2014

(86) PCT No.: PCT/SE2014/050797
§ 371 (c)(1),
(2) Date: Mar. 21, 2016

(87) PCT Pub. No.: WO2015/047154
PCT Pub. Date: Apr. 2, 2015

(65) Prior Publication Data
US 2016/0211892 A1    Jul. 21, 2016

(30) Foreign Application Priority Data
Sep. 27, 2013  (WO) ................ PCT/CN2013/084407

(51) Int. Cl.
*H04W 4/00*     (2018.01)
*H04B 7/024*    (2017.01)
(Continued)

(52) U.S. Cl.
CPC .......... *H04B 7/024* (2013.01); *H04B 17/336* (2015.01); *H04W 72/042* (2013.01); *H04W 72/0446* (2013.01); *H04W 88/06* (2013.01)

(58) Field of Classification Search
CPC ...................................... H04B 7/024
(Continued)

(56) References Cited

U.S. PATENT DOCUMENTS

2014/0269460 A1*  9/2014  Papasakellariou .... H04L 5/1469
                                                        370/294
2015/0063177 A1*  3/2015  Kim ....................... H04B 7/024
                                                        370/280
(Continued)

FOREIGN PATENT DOCUMENTS

WO     2013140244 A1    9/2013

OTHER PUBLICATIONS

PCT International Search Report, dated Oct. 9, 2014, in connection with International Application No. PCT/SE2014/050797, all pages.
(Continued)

*Primary Examiner* — Christopher R Crompton
(74) *Attorney, Agent, or Firm* — Leffler Intellectual Property Law, PLLC

(57) ABSTRACT

A method and a wireless device for operating in a Coordinated Multi Point (CoMP) scenario where the wireless device is served by at least two transmission points of a wireless network employing Time Domain Duplex (TDD). The wireless device receives at least two different uplink-downlink configurations which are valid for corresponding transmission points of the at least two transmission points. The wireless device further monitors a downlink control channel in all possible downlink subframes indicated by the received uplink-downlink configurations and not being assigned with uplink transmission for the wireless device,
(Continued)

such that the wireless device monitors the downlink control channel in subframes being indicated as downlink by at least one of the different uplink-downlink configurations.

20 Claims, 5 Drawing Sheets

(51) Int. Cl.
  *H04B 17/336* (2015.01)
  *H04W 72/04* (2009.01)
  *H04W 88/06* (2009.01)
(58) Field of Classification Search
  USPC .......................................................... 370/329
  See application file for complete search history.

(56) References Cited

U.S. PATENT DOCUMENTS

2016/0233986 A1* 8/2016 Lee .................... H04W 72/1289
2016/0242188 A1* 8/2016 Tiirola .................. H04W 24/10

OTHER PUBLICATIONS

3GPP TSG RAN WG1 Meeting #74, R1-133580, Barcelona, Spain, Aug. 19-23, 2013, CSI measurement for eIMTA, 4 pages.

3GPP TSG RAN WG1 #74, R1-133414, Barcelona, Spain, Aug. 19-23, 2013, on CSI enhancements for Dynamic TDD, 4 pages.

3GPP TSG RAN WG1 Meeting #74, R1-133771, Barcelona, Spain Aug. 19-23, 2013, UE measurements in TDD eIMTA, 6 pages.

3GPP TSG RAN WG1 Meeting #74, R1-133227, Barcelona, Spain, Aug. 19-23, 2013, Enhancements of DL CSI measurements for eIMTA, 16 pages.
International Preliminary Report on Patentability, dated Mar. 29, 2016, in connection with International Application No. PCT/SE2014/050797, 8 pages.

* cited by examiner

METHOD AND WIRELESS DEVICE FOR MONITORING A DOWNLINK CONTROL CHANNEL

TECHNICAL FIELD

The present disclosure relates generally to a method and a wireless device for operating in a Coordinated Multi Point, CoMP, scenario where the wireless device is served by at least two transmission points of a wireless network.

BACKGROUND

In the field of wireless communication, the terms "User Equipment, UE" and "wireless device" are commonly used for various communication entities e.g. including mobile telephones, tablets and laptop computers. In this disclosure, "wireless device" will be used to represent any wireless communication entity capable of communicating radio signals with a wireless network. It should be noted that a wireless device in this context may also be a Machine Type Communication, MTC, device such as a sensor, counter or measuring device arranged to operate automatically and send reports or other messages to some central node.

Further, the term "transmission point", sometimes also referred to as a base station, network node, radio node, eNodeB, eNB, etc., represents any node of a wireless network that is arranged to communicate radio signals with wireless devices. Throughout this disclosure, the term transmission point is interchangeable with eNodeB, eNB, Tx/Rx point or base station, and the term wireless device is interchangeable with UE.

Long Term Evolution, LTE, is a mobile broadband wireless communication technology defined by the third Generation Partnership Project, 3GPP. According to LTE, radio signals are transmitted from transmission points referred to as eNodeBs or eNBs by 3GPP, to wireless devices referred to as UEs by 3GPP, using Orthogonal Frequency-Division Multiplexing, OFDM. In a wireless network, a Time Division Duplex, TDD, configuration of subframes may be used for uplink and downlink transmissions in cells where consecutive subframes are comprised in a repeatable radio frame.

The subframes are reserved for either uplink transmissions from wireless devices to a serving transmission point or downlink transmissions from the transmission point to the wireless devices such that uplink and downlink transmissions do not occur at the same time within the cell. A subframe is basically defined by a preset time period of a certain length, typically 1 millisecond (ms), and each subframe may comprise two time slots of 0.5 ms each. Further, a radio frame comprises a predefined number of consecutive subframes, e.g. ten subframes. In such a network, different transmission points are able to use different uplink-downlink, UL-DL, configurations of subframes, e.g. depending on the current need for uplink and downlink bandwidth resources. An example of a downlink-uplink configuration of subframes is shown in FIG. 1. including downlink subframes "D", uplink subframes "U" and so-called special subframes "S". The special subframes S are configured with one part reserved for downlink, another part reserved for uplink, and a guard period with no transmission between the above two parts, thus allowing neither uplink nor downlink during the guard period.

A set of different predefined UL-DL configurations that can be used by transmission points in different cells is shown in the table of FIG. 2 comprising seven different UL-DL configurations 0-6 each having ten subframes 0-9 of a repeatable radio frame It can be seen in this example that the first three subframes 0-2 and subframe 5 are reserved for downlink D, special S, uplink U, and downlink D, respectively, in all UL-DL configurations 0-6, while the remaining subframes 3, 4, 6-9 can vary in different UL-DL configurations. The latter subframes 3, 4, 6-9 may thus be referred to as flexible subframes, indicated by "F" in the figure, and the other subframes are typically called fixed subframes.

In this disclosure, the term "flexible subframe" denotes a subframe in which the direction of transmission, i.e. downlink or uplink, may differ between different cells so that the flexible subframe may be used for downlink in one cell and for uplink in another cell. Further, a flexible subframe may differ from one radio frame to another in the same cell so that the flexible subframe may be used in the cell for downlink in one radio frame and for uplink in another radio frame, which is commonly referred to as "dynamic TDD". Thereby, the link direction of transmissions in flexible subframes is not obviously predictable and some amount of signaling is needed from the cell's transmission point to indicate the current direction of a flexible subframe to wireless devices in the cell.

However, it may be a problem that when a wireless device is operating in a Coordinated Multi Point, CoMP, scenario and is served by two or more transmission points, it may receive at least two different UL-DL configurations signaled from different transmission points where one or more subframes are flexible in the sense that they do not have the same link direction in all serving transmission points. In other words, the wireless device may receive UL-DL configurations with at least one conflicting subframe which is configured for uplink transmission in one serving transmission point and for downlink transmission in another serving transmission point, e.g. such as any of subframes 3, 4, 6-9 in FIG. 2. Consequently, the wireless device is not able to determine in which subframes it should monitor a downlink control channel and possibly also perform Channel State Information, CSI, measurement which in turn may result in missed control information such as resource assignments and possibly also deficient measuring of channel quality.

SUMMARY

It is an object of embodiments described herein to address at least some of the problems and issues outlined above. It is possible to achieve this object and others by using a method and a node as defined in the attached independent claims.

According to one aspect, a method is provided in a wireless device for operating in a Coordinated Multi Point, CoMP, scenario where the wireless device is served by at least two transmission points of a wireless network employing Time Domain Duplex, TDD. In this method, the wireless device receives at least two different uplink-downlink configurations which are valid for corresponding transmission points of the at least two transmission points. The wireless device further monitors a downlink control channel in all possible downlink subframes indicated by the received uplink-downlink configurations and not being assigned with uplink transmission for the wireless device, such that the wireless device monitors the downlink control channel in subframes being indicated as downlink by at least one of the different uplink-downlink configurations.

According to another aspect, a wireless device is provided which is capable of operating in a CoMP scenario where the wireless device is served by at least two transmission points of a wireless network employing TDD. The wireless device comprises means, e.g. a receiving module, configured to receive at least two different uplink-downlink configurations which are valid for corresponding transmission points of the at least two transmission points. The wireless device also comprises means, e.g. a monitoring module, configured to monitor a downlink control channel in all possible downlink subframes indicated by the received uplink-downlink configurations and not being assigned with uplink transmission for the wireless device such that the wireless device monitors the downlink control channel in subframes being indicated as downlink by at least one of the different uplink-downlink configurations.

When using the above method and device, it can be ensured that the wireless device will monitor the downlink control channel whenever control information might be transmitted from either of the two transmission points TP1 and TP2 so that the risk of missing any pertinent control information can be minimized. Such pertinent control information may for example comprise resource assignments and instructions related to handover, measurements and power regulation.

A computer program is also provided comprising instructions which, when executed on at least one processor, cause the at least one processor to carry out either of the above methods. A carrier is also provided which contains the above computer program, wherein the carrier is one of an electronic signal, optical signal, radio signal, or computer readable storage medium.

The above method and wireless device may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to ensure that a wireless device is able to receive control information, e.g. containing assignments for transmission or reception, on a downlink control channel when operating in a CoMP scenario and being served by at least two transmission points of a wireless network. As said above, the wireless device may in a CoMP scenario receive at least two different UL-DL configurations signaled from different transmission points where one or more subframes are flexible, i.e. they can have different link directions such as uplink in one UL-DL configuration and downlink in another UL-DL configuration.

Figure 3:
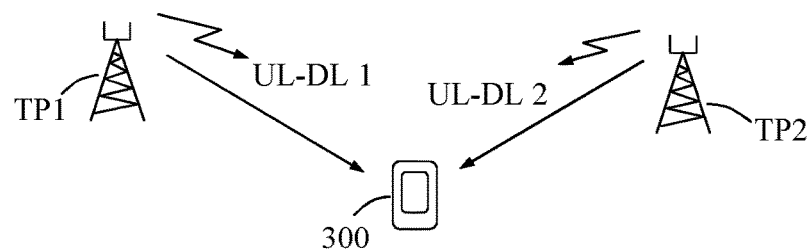
FIG. 3 is a communication scenario illustrating a wireless device being served by two transmission points, where the embodiments described herein may be used.

FIG. 3 illustrates this situation where a wireless device 300 is being served by two transmission points TP1 and TP2. It is schematically shown that the wireless device 300 receives two different UL-DL configurations including one configuration UL-DL 1 valid for transmission point TP1 and another configuration UL-DL 2 valid for transmission point TP2. One or more subframes therein may thus be of different link directions in the two configurations UL-DL 1, UL-DL 2, which may be referred to as subframes with conflicting link directions. Embodiments described herein may be used to ensure that the wireless device 300 is able to receive control information from either of the two transmission points TP1 and TP2, even in subframes with conflicting link directions.

In this solution, the wireless device monitors a downlink control channel in all possible downlink subframes as indicated by the received UL-DL configurations UL-DL 1, UL-DL 2 and not being assigned with uplink transmission for the wireless device. Thereby, the wireless device will monitor the downlink control channel whenever control information might be transmitted from either of the two transmission points TP1 and TP2 such that the risk of missing any pertinent control information can be minimized, such as e.g. resource assignments and instructions related to handover, measurements and power regulation, which could otherwise impair performance in terms of connectivity, data throughput and/or quality.

Firstly, the concept of employing CoMP in a wireless network will be described in more detail. Coordination can take many forms and downlink coordination schemes are typically classified into different DL CoMP modes. Currently in 3GPP, several DL CoMP modes are supported in the 3GPP standard specification. The following three examples of CoMP modes are supported in Release 11:

Dynamic Point Selection (DPS): A transmission point is dynamically selected to serve a wireless device within a group of cooperative candidate transmission points, so as to improve DL throughput for the wireless device and/or the overall system performance.

Dynamic Point Blanking (DPB): The network actively and dynamically mutes one or more transmission points to reduce the interference experienced by wireless devices that are scheduled for DL transmission in neighboring cells.

Non-coherent Joint TX (NJT): More than one transmission point serve a wireless device and transmit the same data blocks to the wireless device simultaneously. Thereby, the wireless device receives a combined version of signals from more than one signal path from the transmission points. The jointly transmitted signal can raise an average ratio between signal and noise plus interference, referred to as the Signal over Noise and Interference Ratio, SINR. As a consequence, the DL signal quality can be improved.

Secondly, the concept of employing dynamic TDD in a wireless network will be described in more detail. With dynamic TDD, it is possible for each cell to switch its UL-DL configuration according to instantaneous traffic demand. A possible way to realize dynamic TDD is to configure two reference UL-DL configurations for the wireless device, one for UL transmissions and one for DL transmissions. Thereby, a UL reference UL-DL configuration can be broadcasted in a System Information Block, SIB and a DL reference UL-DL configuration can be conveyed to the wireless device via dedicated signaling. For wireless device capable of operating with dynamic TDD, the UL-DL configuration can switch within a group of UL-DL configurations where the UL subframes of each UL-DL configuration are indicated by the UL reference UL-DL configuration and the DL subframes are indicated by the DL reference UL-DL configuration.

It has been assumed during standardization of dynamic TDD that a group common explicit signaling can be used to notify dynamic capable wireless devices about the UL-DL configuration currently used within a cell, which thus may change from one radio frame to another. This may bring some benefits in performance, e.g. by avoiding interference between wireless devices due to false detection of a Physical Hybrid ARQ Indicator Channel PHICH, energy saving, etc.

In case of TDD, there is usually a single carrier frequency used for both UL and DL transmissions which are separated in time. Because the same carrier frequency is used for UL and DL transmission, both the serving transmission point and the wireless devices need to switch between transmission to reception on a subframe basis. It is therefore necessary to provide a sufficiently large guard time where neither DL nor UL transmission occur in order to avoid interference between UL and DL transmission.

In current wireless networks, a UL/DL configuration is normally used semi-statically, thus it may not be optimal for the instantaneous traffic situation, i.e. the current traffic load which may shift between being "UL heavy" and "DL heavy", also referred to as load imbalance between UL and DL. As a result the available radio resources may be utilized inefficiently in both UL and DL transmission, especially in cells with a small number of devices. In order to provide a more flexible TDD configuration adapted to the current traffic load, the concept of Dynamic TDD has been introduced which is sometimes also referred to as Flexible TDD.

Accordingly, it is possible that dynamic TDD can provide performance improvements when there is a potential load imbalance between UL and DL and particularly when that load imbalance fluctuates rapidly. Besides, the dynamic TDD approach can also be utilized to reduce network energy consumption. It is expected that dynamic TDD should be able to provide a good adaption of allocated resources to instantaneous traffic. Further, in Layer one controlled dynamic TDD, the transmission point decides whether a flexible subframe should be a DL or a UL subframe, and the wireless device is able to follow e.g. UL and DL grants or some indicators signaled from the transmission point to determine whether the subframe is a DL or a UL subframe. If the transmission point schedules the wireless device in the flexible subframe as UL, then the wireless device will transmit on the scheduled or assigned UL subframe. Similarly, if the transmission point schedules the wireless device in the flexible subframe as DL, the wireless device will receive a DL signal in the flexible subframe.

An example of a procedure performed by a wireless device for operating in a CoMP scenario will now be described with reference to the flow chart in FIG. 4. In this procedure, the wireless device is served by at least two transmission points, such as TP1, TP2 in FIG. 3, which are comprised in a wireless network employing TDD where uplink subframes and downlink subframes are separated in time.

In a first action 400, the wireless device receives at least two different UL-DL configurations which are valid for corresponding transmission points of the at least two transmission points, e.g. as shown in FIG. 3. Although the examples and embodiments described herein involve two serving transmission points, it should be understood that the solution may be valid and used for any number of transmission points serving the wireless device.

In a next action 402, the wireless device monitors a downlink control channel in all possible downlink subframes indicated by the received uplink-downlink configurations and not being assigned with uplink transmission for the wireless device. In some embodiments, the monitored downlink control channel may be a Physical Downlink Control Channel, PDCCH, or an enhanced PDCCH, ePDCCH.

Figure 1:
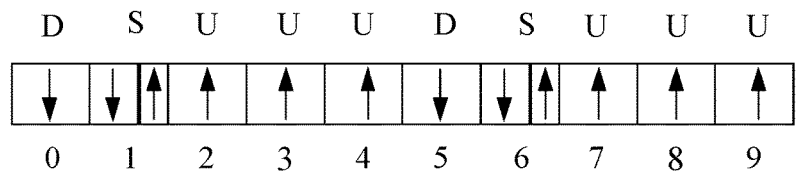
FIG. 1 is a diagram of subframes illustrating an example of a downlink-uplink configuration, according to the prior art.
Figure 2:
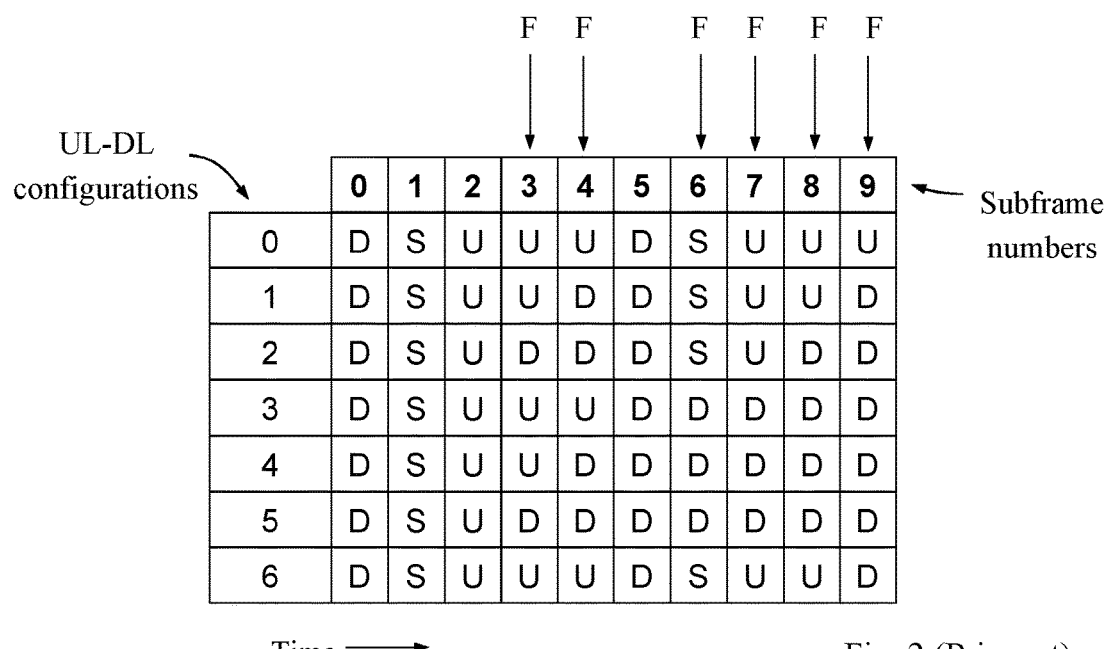
FIG. 2 is a table illustrating some typical DL-UL configurations that may be used by different transmission points in a wireless network, according to the prior art.

In action 402, the wireless device thus monitors the downlink control channel in subframes being indicated as downlink by at least one of the different uplink-downlink configurations, such as any of the configurations UL-DL 1, UL-DL 2 in FIG. 2. For example, one configuration, e.g. UL-DL 1, may indicate a subframe as uplink and another configuration, e.g. UL-DL 2, may indicate the same subframe as downlink. In that case, the wireless device monitors the downlink control channel in that subframe since pertinent control information could be transmitted from transmission point TP2 in that subframe, which the wireless device is able to receive and will not miss. The wireless device will also monitor the downlink control channel in a subframe that is indicated as downlink by all the received UL-DL configurations.

Thus, for control channel monitoring, it is proposed that the control channel shall be monitored in all possible downlink subframes, indicated by any of the received UL-DL configurations valid for multiple transmission points, except any subframe that has been assigned with uplink transmissions for this wireless device, e.g. where the wireless device is scheduled to transmit on Physical Uplink Shared Channel PUSCH by UL grant, PHICH or semi-persist scheduling, or when the wireless device is instructed to report CSI measurements, etc. Assuming two transmission points are serving the wireless device as shown in FIG. 3, the received UL-DL configurations may include a UL-DL configuration in a System Information Block SIB-1, a UL-DL configuration for a first cell controlled by a first transmission point, and a UL-DL configuration for a second cell controlled by a second transmission point. It should be noted that when dynamic TDD is employed, at least the two latter cell-specific UL-DL configurations may change on a radio frame basis, e.g. depending on the current traffic demands.

Figure 4:
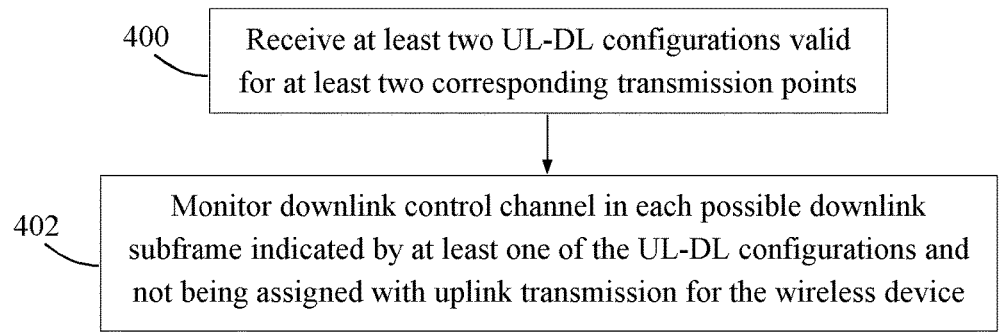
FIG. 4 is a flow chart illustrating a procedure in a wireless device, according to some possible embodiments.

The procedure of FIG. 4 may be carried out according to different optional embodiments. In action 402, the wireless device monitors the downlink control channel in subframes not being assigned with uplink transmission for the wireless device. In a possible embodiment, if at least one of the possible downlink subframes has been assigned with uplink transmission for the wireless device, the wireless device will exclude the at least one assigned subframe from the monitoring in action 402. Thereby, the wireless device will not transmit and monitor at the same time since the downlink control channel cannot be monitored due to the ensuing simultaneous transmission by the wireless device on the same carrier frequency which will thus disturb and make the monitoring useless. In this context, the term "assigned" means that the wireless device has been instructed by one of the serving transmission points to transmit in an uplink subframe according to one received UL-DL configuration such that no monitoring can be done in a coinciding possible downlink subframe according to another received UL-DL configuration.

Figure 5:
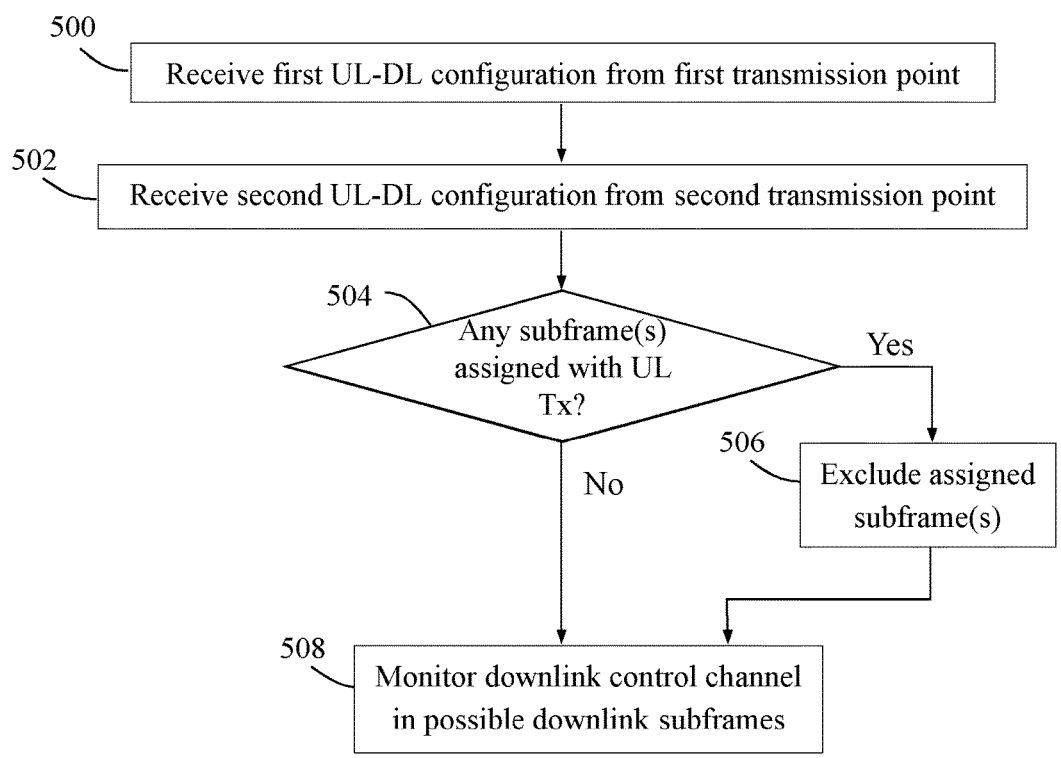
FIG. 5 is a flow chart illustrating another procedure in a wireless device when a subframe may be assigned with uplink transmission, according to further possible embodiments.

FIG. 5 illustrates an example of a procedure performed by the wireless device when a subframe may be assigned with uplink transmission for the wireless device, as mentioned above. In this example, the wireless device receives a first UL-DL configuration from a first transmission point in an action 500, and receives a second UL-DL configuration from a second transmission point in another action 502. All possible downlink subframes include the subframes which are indicated as downlink by at least one of the two received UL-DL configurations.

The wireless device then determines whether any of the possible downlink subframes have been assigned with uplink transmission for the wireless device, in an action 504. If any of the possible downlink subframes has been assigned with uplink transmission, the wireless device excludes the assigned subframe(s) from the monitoring, in another action 506. If not this action is omitted. In either case, the wireless device performs the monitoring of the downlink control channel in the possible downlink subframe(s) not assigned with uplink transmission for the wireless device, in a final shown action 508.

In further embodiments, the at least two different uplink-downlink configurations received in action 400 may include at least one of:
- an UL-DL configuration received in a broadcasted SIB, e.g. one called SIB-1, and
- UL-DL configurations for respective cells served by the at least two transmission points (TP1, TP2) received in dedicated signaling from respective transmission points.

The broadcasted SIB, e.g. SIB-1, typically contains a UL-DL configuration which can be used as default, while if another UL-DL configuration is indicated in dedicated signaling from a transmission point it will be valid for that transmission point instead of the default UL-DL configuration. The transmission point may thus decide that the default UL-DL configuration should be used by not indicating another UL-DL configuration in dedicated signaling, or that another UL-DL configuration should be used by indicating it in the dedicated signaling.

According to further embodiments, each of the at least two UL-DL configurations may be associated with a Channel State Information, CSI, process. In that case, the wireless device may use a downlink CSI Reference Signal denoted CSI-RS, and/or a CSI Interference Measurement resource denoted CSI-IM resource, for CSI measurement where the CSI-RS and/or CSI-IM resource is measured in subframes configured for downlink according to each respective UL-DL configuration and associated CSI process.

For CSI measurement in general, each CSI process is associated with one UL-DL configuration. The UL-DL configuration for a CSI process may thus be dynamically updated with the received UL-DL configuration signaling. The CSI-RS, e.g. zero-power CSI-RS, non-zero power CSI-RS and/or the CSI-IM resource, of one CSI process can be used for CSI measurement in a subframe provided that the subframe is configured as downlink by its associated UL-DL configuration and provided that the subframe is not assigned with uplink transmission for this wireless device.

The CSI reference resource is typically defined by a single downlink subframe in the time domain. In addition to the current standard specification's definition of a "valid" downlink subframe, a downlink subframe for a given CSI process is considered to be valid if the subframe is indicated as downlink by the given UL-DL configuration associated with that CSI process. As an alternative, a downlink subframe for a given CSI process may be considered to be valid if the subframe is indicated as downlink by given UL-DL configuration for that CSI process and if the subframe is not assigned with uplink transmissions for this wireless device.

In another embodiment, when each of the at least two UL-DL configurations is associated with a CSI process, the wireless device may obtain identifiers configured for respective CSI processes, and determine UL-DL configurations to be used for the respective CSI processes based on the received identifiers. Such identifiers may be signaled from the respective transmission points. Alternatively, the association between CSI process and UL-DL configuration may be predefined and already known by the wireless device. In that case, no identifier needs to be signaled for determining the UL-DL configuration of a CSI process which will thus not occupy any DCI bits.

Figure 6:
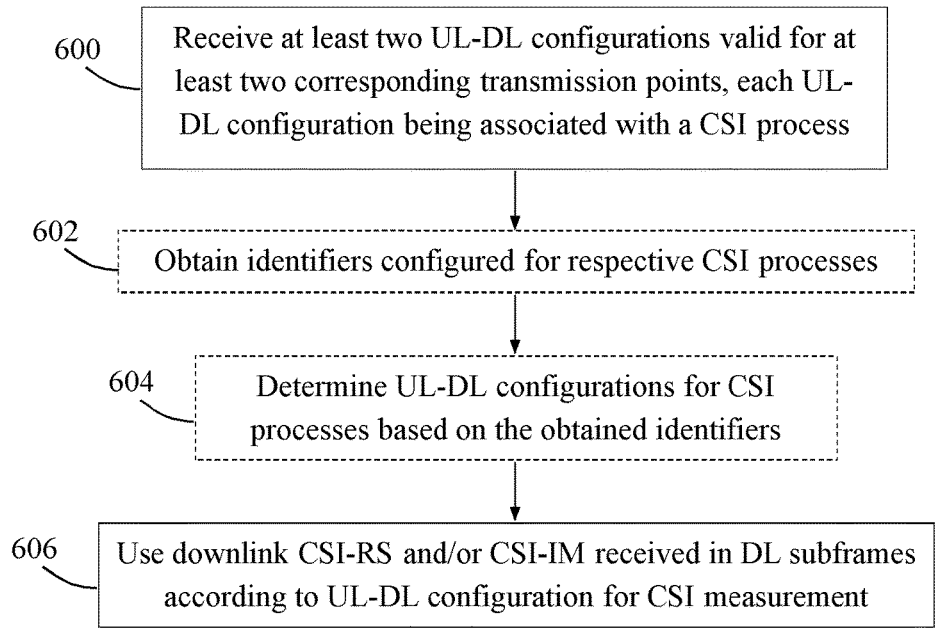
FIG. 6 is a flow chart illustrating another procedure in a wireless device when handling CSI measurements, according to further possible embodiments

The above-described handling of CSI measurements is illustrated by a schematic procedure performed by the wireless device according to the flow chart of FIG. 6. In a first shown action 600, the wireless device receives at least two UL-DL configurations valid for at least two corresponding transmission points, as similar to action 400 above. In this example, each received UL-DL configuration is associated with a CSI process which dictates how the wireless device should perform CSI measurements.

An optional action 602 illustrates that the wireless device may obtain identifiers configured for respective CSI processes, which identifiers are signaled from the respective transmission points. Alternatively, the association between CSI process and UL-DL configuration may be predefined and already known by the wireless device, as mentioned above. The wireless device may then determine the UL-DL configurations to be used for the respective CSI processes based on the received identifiers, as shown by another optional action 604. In a final shown action 606, the wireless device is then able to use a downlink CSI-RS, and/or a CSI-IM resource transmitted by the respective transmission points, for CSI measurement in downlink subframes according to each respective uplink-downlink configuration and associated CSI process.

In further embodiments, the wireless device may obtain the above identifiers from Downlink Control Information, DCI, signaled by respective transmission points. In that case the DCI may be carried by any of:
- Physical Downlink Control Channel, PDCCH, the DCI being implicitly associated with the respective transmission point,
- enhanced Physical Downlink Control Channel, ePDCCH, the DCI being implicitly associated with the respective transmission point, and
- ePDCCH the DCI being explicitly associated with the respective transmission point.

The above three examples of obtaining the identifiers from the signaled DCI will be described in more detail later below.

In another example embodiment, the wireless device may perform the CSI measurement according to two CSI measurement sets defined for each CSI process. Each CSI process may thus involve multiple CSI measurement sets to indicate which subframes should be used for the CSI measurement. In this example, the CSI measurement sets comprise a first CSI measurement set of fixed subframes assigned only with downlink transmission and a second CSI measurement set of flexible subframes assigned with downlink transmission and with uplink transmission. In this case, another example embodiment may be that if at least one of the possible downlink subframes has been assigned with uplink transmission for the wireless device, the wireless device will exclude the at least one assigned subframe when using the downlink CSI-RS and/or CSI-IM resource for CSI measurement. It should be noted that the solution is not limited to the above-described example of how the two CSI measurement sets are configured for the CSI measurement, and that such CSI measurement sets may be configured in any manner to control CSI measurement.

It was mentioned above that the wireless device may obtain identifiers configured for respective CSI processes from the signaled DCI according to three examples, which will now be described in more detail. These examples will be referred to as Case 1-3 below.

As said above, each CSI process may be associated with one UL-DL configuration, and the UL-DL configuration for each CSI process may be dynamically updated with the received UL-DL configuration signaling.

For the association between UL-DL configuration and CSI process, one identifier may be configured for each CSI process. The identifier can be used to determine the UL-DL configuration for the given CSI process. When different explicit UL-DL configuration signaling design is used for different transmission points, the identifier may have different meaning. In this description, the term "signaling design" means how to transmit, e.g. carried by PDCCH or ePDCCH, and what to transmit, e.g. the UL-DL configuration for each transmission point. The following example cases 1-3 show how to associate CSI process with UL-DL configuration. For these different cases, the "identifier" in the CSI process may thus have different meaning. In this context, different meaning corresponds to different association.

Case 1: DCI comprising the UL-DL configuration is carried by PDCCH and implicitly associated with the transmission point.

In this case, different transmission points use different sub-search-spaces or different Radio Network temporary Identifiers, RNTIs, to transmit its UL-DL configuration DCI. The UL-DL configuration DCI for the transmission point is encoded separately. Each sub-search-space or RNTI is associated with one transmission point and its UL-DL configuration accordingly. In this case, the identifier can be an index of a sub-search-space or RNTI.

Case 2: DCI comprising the UL-DL configuration is carried by ePDCCH and implicitly associated with the transmission point.

In this case, each transmission point is configured with one ePDCCH set for the wireless device, The UL-DL configuration DCI used for the transmission point is transmitted in the ePDCCH set configured for that transmission point. In this case, the identifier can be the index of the ePDCCH set. Similarly as Case 1, different transmission points may use different sub-search-spaces or different RNTIs to transmit its UL-DL configuration DCI. Each sub-search-space or RNTI is associated with one transmission point and its UL-DL configuration accordingly. In this case as well, the identifier can be an index of a sub-search-space or RNTI.

Case 3: DCI comprising the UL-DL configuration is carried by (e)PDCCH and explicitly associated with the transmission point.

In this case, the UL-DL configuration for each transmission point is explicitly transmitted in the DCI. In one example of the transmission, the transmission point identifier and its associated UL-DL configuration are coded into several bits, and the coded bits for one or some or all of the transmission points are concatenated into a payload for the PDCCH or the ePDCCH. In another example, the UL-DL configuration for each transmission point may be coded in a certain order or sequence, and the coded bits for one or some or all of the transmission points are concatenated into a payload for the PDCCH or the ePDCCH. The UL-DL configuration index may be taken as the identifier for each transmission point. In the former example above, the identifier in the CSI process may be the same as the identifier in the UL-DL configuration DCI. In the latter example, the identifier can be the UL-DL configuration index.

As an alternative, the UL-DL configuration may be statically configured in each CSI process.

Figure 7:
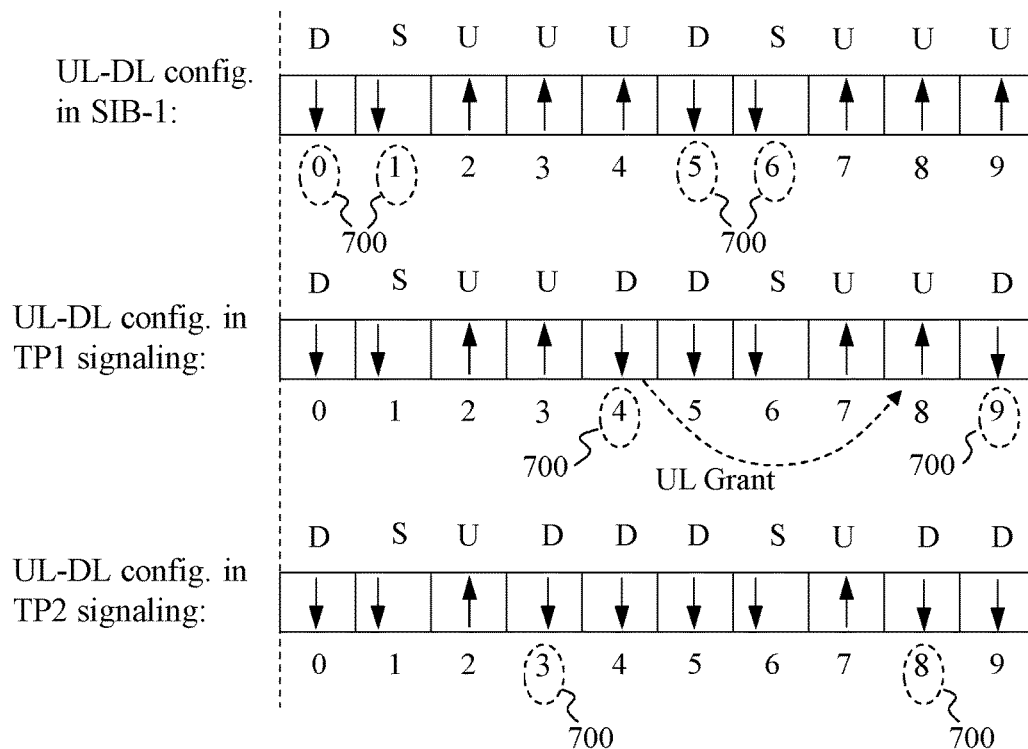
FIG. 7 is a diagram illustrating how a wireless device may identify possible downlink subframes when receiving multiple downlink-uplink configurations, according to further possible embodiments.

FIG. 7 illustrates some examples of UL-DL configurations that a wireless device may receive when being served by a first transmission point TP1 and a second transmission point TP2 in a CoMP scenario. In this example, the wireless device receives a default UL-DL configuration according to the top row of subframes 0-9, as broadcasted in SIB-1 by either or both of the transmission points TP1, TP2, where subframes 0, 1, 5 and 6 are indicated as downlink.

The wireless device also receives a first cell-specific UL-DL configuration in dedicated signaling from the first transmission point TP1, according to the middle row of subframes 0-9, where further subframes 4 and 9 are indicated as downlink. The wireless device further receives a second cell-specific UL-DL configuration in dedicated signaling from the second transmission point TP2, according to the bottom row of subframes 0-9, where further subframes 3 and 8 are indicated as downlink.

When these three UL-DL configurations are received, the wireless device will monitor a downlink control channel in all possible downlink subframes 700 indicated by the received UL-DL configurations and not being assigned with uplink transmission for the wireless device. In this example, the wireless device will thus monitor the downlink control channel in subframes 0, 1, 3-6, 8 and 9, provided that they have not been assigned with uplink transmission for the wireless device. Any subframe that has been assigned with uplink transmission will be excluded from the monitoring, as described above.

Figure 8:
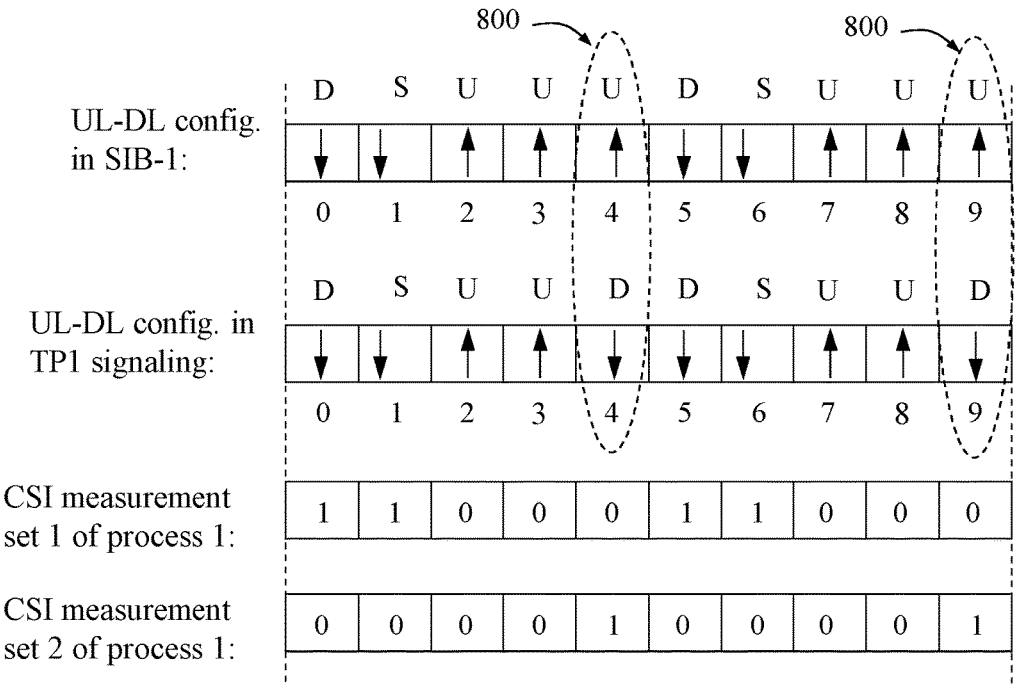
FIG. 8 is a diagram illustrating an example of how a wireless device may identify CSI measurement sets for CSI measurement when receiving multiple downlink-uplink configurations, according to further possible embodiments.
Figure 9:
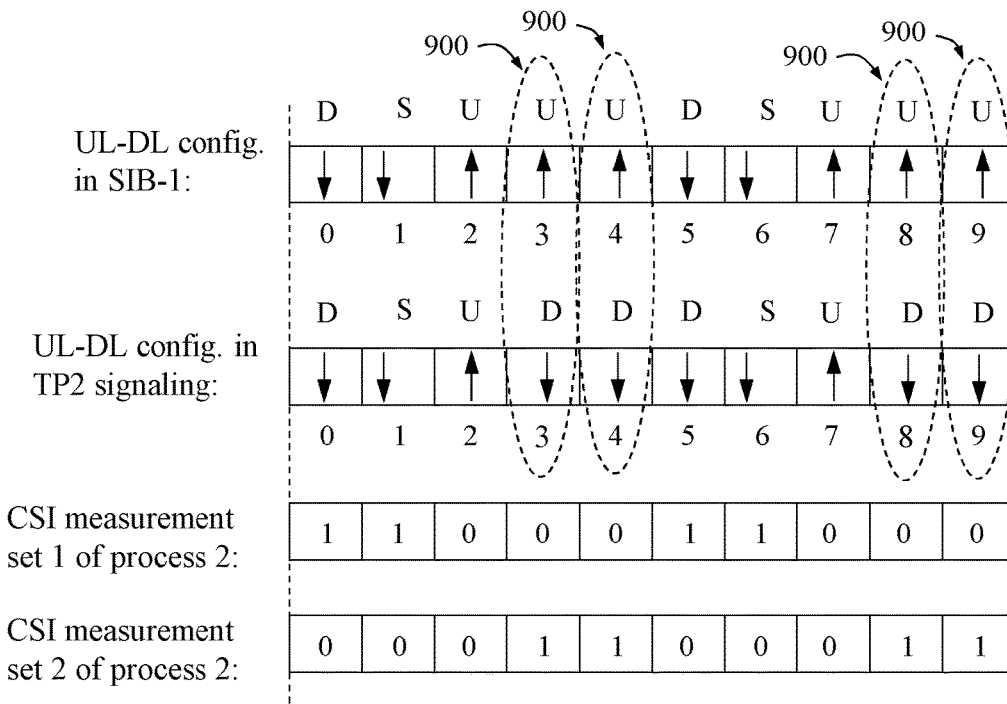
FIG. 9 is a diagram illustrating another example of how a wireless device may identify CSI measurement sets for CSI measurement when receiving multiple downlink-uplink configurations, according to further possible embodiments.

It was also mentioned above that the wireless device may perform CSI measurements according to multiple CSI measurement sets defined for each CSI process. An example of how the wireless device may perform the CSI measurements when receiving the three UL-DL configurations shown in FIG. 7, will now be described with reference to FIGS. 8 and 9. In this example, two CSI measurement sets are defined for each CSI process as follows. FIG. 8 illustrates a first CSI process 1 with two CSI measurement sets valid for the first transmission point TP1. FIG. 9 illustrates a second CSI process 2 with two CSI measurement sets valid for the second transmission point TP2.

For each CSI process, the CSI-RS is valid only if the subframe is configured as downlink subframe by its associated UL-DL configuration and it is not assigned with uplink transmission for this wireless device. Further, the first CSI process 1 is assigned to measure the channel quality from TP1, and the second CSI process 2 is assigned to measure the channel quality from TP2. In this example, for CSI process 1 shown in FIG. 8, the valid downlink subframes are subframes 0, 1, 4, 5, 6, 9, and for CSI process 2 shown in FIG. 9, the valid downlink subframes are subframes 0, 1, 3, 4, 5, 6, 8, 9. In this case two CSI measurement sets are defined for each CSI process 1 and 2, one is for fixed downlink subframes, shown as CSI measurement set 1, and one is for flexible subframes, shown as CSI measurement set 2.

As shown in FIG. 8, CSI measurement set 1 of CSI process 1 indicates a valid downlink subframe denoted "1" in subframes 0, 1, 5, 6, and CSI measurement set 2 of CSI process 1 indicates a valid downlink subframe denoted "1" in subframes 4, 9. Further, subframes 4 and 9 are flexible subframes 800 since they have different link directions in different UL-DL configurations. As shown in FIG. 9, CSI measurement set 1 of CSI process 2 indicates a valid downlink subframe denoted "1" in subframes 0, 1, 5, 6, and the CSI measurement set 2 of CSI process 2 indicates a valid downlink subframe denoted "1" in subframes 3, 4, 8, 9. In this case, subframes 3, 4, 8 and 9 are flexible subframes 900 since they have different link directions in different UL-DL configurations.

In case one of the possible downlink subframes has been assigned with uplink transmissions for this wireless device, the subframe cannot be assumed as a valid downlink subframe. In this example, it is assumed that the wireless device has been allowed to transmit in subframe 8 by receiving an uplink grant from TP1 in subframe 4, as indicated by a dashed arrow in FIG. 7. As a result, subframe 8 cannot be determined by the wireless device to be a valid downlink subframe, since this subframe has been assigned by the UL grant in subframe 4 in accordance with the "uplink" subframe 8 of the first cell-specific UL-DL configuration signaled from TP1. The wireless device should therefore not perform CSI measurement in subframe 8, in spite of CSI measurement set 2 of process 2 which indicates subframe 8 as a valid subframe for CSI measurement.

In order to determine CSI reference resource, the valid subframe shall be given in the time domain. The above principle to determine the downlink subframe valid or not for CSI-RS may be reused. As an alternative, all the downlink subframes indicated by the UL-DL configuration can be assumed as valid downlink subframes.

Figure 10:
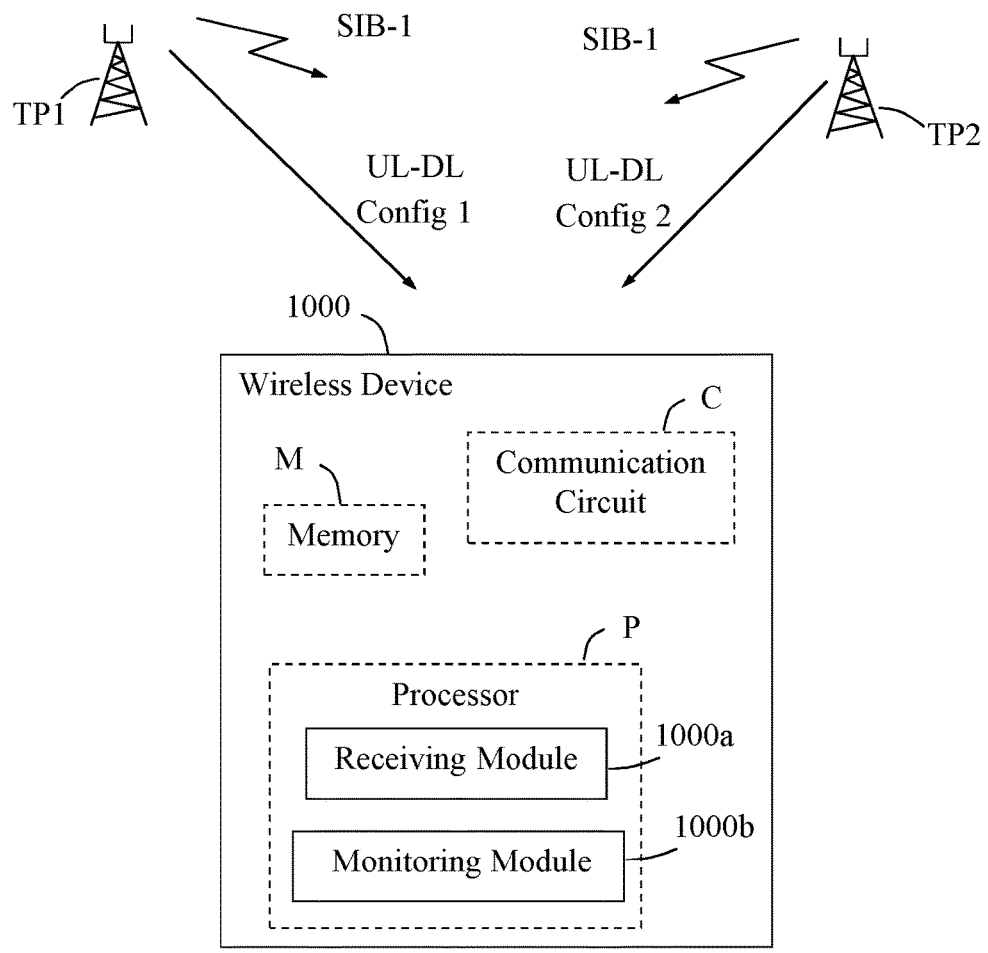
FIG. 10 is a block diagram illustrating a wireless device in more detail, according to further possible embodiments.

A detailed but non-limiting example of how a wireless device may be structured with some possible functional entities such as modules, circuits or units, to bring about the above-described functionality of the wireless device, is illustrated by the block diagram in FIG. 10. In this figure, the wireless device 1000 is capable of operating in a CoMP scenario where the wireless device 1000 is served by at least two transmission points TP1, TP2 of a wireless network employing TDD where uplink subframes and downlink subframes are separated in time. FIG. 10 illustrates schematically that the transmission points TP1, TP2 may indicate their currently used DL-UL configurations in broadcasted SIB-1 and/or in dedicated signaling, as described above.

The wireless device 1000 may be configured to operate according to any of the examples and embodiments of employing the solution as described above and as follows. In particular, the wireless device 1000 may comprise means arranged or configured to perform at least the actions of the flow chart in FIG. 4 and possibly also to operate in the manner described for any of FIGS. 4-9. These means may be realized in the form of different functional modules 1000a, 1000b as described below. In order to put any of this into practice, the wireless device 1000 may be implemented with means comprising a communication circuit C, a memory M and an operable processor P comprising various functional modules as described below. The memory M may contain instructions executable by the processor P.

More specifically, the wireless device 1000 comprises means configured to receive at least two different uplink-downlink configurations which are valid for corresponding transmission points of the at least two transmission points TP1, TP2. This receiving operation may be performed by a receiving module 1000a, e.g. in the manner described for action 400 above.

The wireless device 1000 also comprises means configured to monitor a downlink control channel in all possible downlink subframes indicated by the received uplink-downlink configurations and not being assigned with uplink transmission for the wireless device 1000. Thereby, the wireless device 1000 monitors the downlink control channel in subframes being indicated as downlink by at least one of the different uplink-downlink configurations. This monitoring operation may be performed by a monitoring module 1000b, e.g. in the manner described for action 402 above.

It should be noted that FIG. 10 illustrates some possible functional modules in the wireless device 1000 and the skilled person is able to implement these functional modules in practice using suitable software and hardware. Thus, the solution is generally not limited to the shown structures of the wireless device 1000, and the functional modules 1000a-b may be configured to operate according to any of the features described in this disclosure, where appropriate.

The embodiments and features described herein may be implemented in a computer program comprising instructions which, when executed on at least one processor, cause the at least one processor to carry out the above actions e.g. as described for any of FIGS. 4-6. Further, the above-described embodiments may be implemented in a carrier containing the above computer program, wherein the carrier is one of an electronic signal, optical signal, radio signal, or computer readable storage medium. The computer readable storage medium may be a compact disc or other carrier suitable for holding the computer program. Some examples of how the computer program and the carrier can be realized in practice are outlined below, with reference to FIG. 10.

The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

The memory M may comprise the above-mentioned computer readable storage medium or carrier on which the computer program is stored e.g. in the form of computer program modules or the like. For example, the memory M may be a flash memory, a Random-Access Memory (RAM), a Read-Only Memory (ROM) or an Electrically Erasable Programmable ROM (EEPROM).

While the solution has been described with reference to specific exemplifying embodiments, the description is generally only intended to illustrate the inventive concept and should not be taken as limiting the scope of the solution. For example, the terms "wireless device", "transmission point", "uplink-downlink configuration" and "Channel State Information, CSI, process" have been used throughout this disclosure, although any other corresponding entities, functions, and/or parameters could also be used having the features and characteristics described here. The solution is defined by the appended claims.

ABBREVIATIONS

LTE Long Term Evolution
TDD Time Domain Duplex
DCI Downlink Control Information
HARQ Hybrid Automatic Repeat Request
PDCCH Physical Downlink Control Channel
ePDCCH enhanced PDCCH
UL Uplink
DL Downlink
CSI Channel State Information
CoMP Coordinated Multi Point
3GPP 3rd Generation Partnership Project
Tx Transmission
Rx Receiving
TP Transmission Point
PHICH Physical Hybrid ARQ Indicator Channel
SIB System Information Block
UE User Equipment
DPS Dynamic Point Selection
DPB Dynamic Point Blanking
NJT Non-coherent Joint TX
CSI-RS CSI Reference Signal
CSI-IM CSI Interference Measurement
NACK Negative Acknowledgement
eNB E-UTRAN NodeB

The invention claimed is:

1. A method performed by a wireless device, the method comprising:
receiving at least two different uplink-downlink configurations which are valid for corresponding transmission points of at least two transmission points of a wireless network employing Time Domain Duplexing (TDD) and operating in a Coordinated Multi Point (CoMP) scenario, wherein the wireless device is served by the at least two transmission points; and
monitoring a downlink control channel in all subframes that are indicated as downlink subframes by any of the received uplink-downlink configurations and not also assigned for performance of uplink transmission by the wireless device, such that the wireless device monitors the downlink control channel in subframes being indicated as downlink by at least one of the different uplink-downlink configurations.

2. A method according to claim 1, wherein if at least one of the possible downlink subframes has been assigned with uplink transmission for the wireless device, the method further comprises excluding the at least one assigned subframe from said monitoring.

3. A method according to claim 1, wherein the at least two different uplink-downlink configurations include at least one of:
an uplink-downlink configuration received in a broadcasted System Information Block, SIB, and
uplink-downlink configurations for respective cells served by the at least two transmission points received in dedicated signalling from respective transmission points.

4. A method according to claim 1, wherein the downlink control channel is a Physical Downlink Control Channel (PDCCH) or an enhanced PDCCH (ePDCCH).

5. A method according to claim 1 wherein each of the at least two uplink-downlink configurations is associated with a Channel State Information (CSI) process, the method further comprising using a downlink CSI Reference Signal (CSI-RS) and/or a CSI Interference Measurement (CSI-IM) resource for CSI measurement where the CSI-RS and/or CSI-IM resource is measured in subframes configured for downlink according to each respective uplink-downlink configuration and associated CSI process.

6. A method according to claim 5, the method further comprising:
obtaining identifiers configured for respective CSI processes, and
determining uplink-downlink configurations to be used for the respective CSI processes based on the obtained identifiers.

7. A method according to claim 6, wherein the wireless device obtains the identifiers from Downlink Control Information (DCI) signalled by respective transmission points, wherein the DCI is carried by any of:
Physical Downlink Control Channel (PDCCH) the DCI being implicitly associated with the respective transmission point,
enhanced Physical Downlink Control Channel (ePDCCH) the DCI being implicitly associated with the respective transmission point, and
ePDCCH the DCI being explicitly associated with the respective transmission point.

8. A method according to claim 5, wherein the wireless device performs the CSI measurement according to two CSI measurement sets defined for each CSI process comprising a first CSI measurement set of fixed subframes assigned only with downlink transmission and a second CSI measurement set of flexible subframes assigned with downlink transmission and with uplink transmission.

9. A method according to any of claim 5, wherein if at least one of the possible downlink subframes has been assigned with uplink transmission for the wireless device, the method further comprises excluding the at least one assigned subframe when using the downlink CSI-RS and/or CSI-IM resource for CSI measurement.

10. A wireless device comprising:
a transceiver; and
a controller,
wherein the controller is configured to:
receive at least two different uplink-downlink configurations which are valid for corresponding transmission points of at least two transmission points of a wireless network employing Time Domain Duplexing (TDD) and operating in a Coordinated Multi Point (CoMP) scenario, wherein the wireless device is served by the at least two transmission points; and
monitor a downlink control channel in all subframes that are indicated as downlink subframes by any of the received uplink-downlink configurations and not also assigned for performance of uplink transmission by the wireless device, such that the wireless device monitors the downlink control channel in subframes being indicated as downlink by at least one of the different uplink-downlink configurations.

11. A wireless device according to claim 10, wherein if at least one of the possible downlink subframes has been assigned with uplink transmission for the wireless device, the wireless device is configured to exclude the at least one assigned subframe when monitoring the downlink control channel.

12. A wireless device according to claim 10, wherein the at least two different uplink-downlink configurations include at least one of:
   an uplink-downlink configuration received in a broadcasted System Information Block (SIB) and
   uplink-downlink configurations for respective cells served by the at least two transmission points received in dedicated signalling from respective transmission points.

13. A wireless device according to claim 10, wherein the downlink control channel is a Physical Downlink Control Channel (PDCCH) or an enhanced PDCCH (ePDCCH).

14. A wireless device according to claim 10, wherein each of the at least two uplink-downlink configurations is associated with a Channel State Information (CSI) process, and the wireless device is configured to use a downlink CSI Reference Signal (CSI-RS) and/or a CSI Interference Measurement (CSI-IM) resource for CSI measurement where the CSI-RS and/or CSI-IM resource is measured in subframes configured for downlink according to each respective uplink-downlink configuration and associated CSI process.

15. A wireless device according to claim 14, wherein the wireless device is configured to:
   obtain identifiers configured for respective CSI processes, and
   determine uplink-downlink configurations to be used for the respective CSI processes based on the obtained identifiers.

16. A wireless device according to claim 15, wherein the wireless device is configured to obtain the identifiers from Downlink Control Information (DCI) signalled by respective transmission points, wherein the DCI is carried by any of:
   Physical Downlink Control Channel (PDCCH) the DCI being implicitly associated with the respective transmission point,
   enhanced Physical Downlink Control Channel (ePDCCH) the DCI being implicitly associated with the respective transmission point, and
   ePDCCH the DCI being explicitly associated with the respective transmission point.

17. A wireless device according to claim 14, wherein the wireless device is configured to perform the CSI measurement according to two CSI measurement sets defined for each CSI process comprising a first CSI measurement set of fixed subframes assigned only with downlink transmission and a second CSI measurement set of flexible subframes assigned with downlink transmission and with uplink transmission.

18. A wireless device according to claim 14, wherein if at least one of the possible downlink subframes has been assigned with uplink transmission for the wireless device, the wireless device is configured to exclude the at least one assigned subframe when using the downlink CSI-RS and/or CSI-IM resource for CSI measurement.

19. A wireless device according to claim 10, wherein said means comprise a processor and a memory wherein said memory is containing instructions executable by said processor.

20. A nontransitory computer readable storage medium comprising a computer program comprising instructions which, when executed on at least one processor, cause the at least one processor to carry out a method performed by a wireless device, the method comprising:
   receiving at least two different uplink-downlink configurations which are valid for corresponding transmission points of at least two transmission points of a wireless network employing Time Domain Duplexing (TDD) and operating in a Coordinated Multi Point (CoMP) scenario, wherein the wireless device is served by the at least two transmission points; and
   monitoring a downlink control channel in all subframes that are indicated as downlink subframes by any of the received uplink-downlink configurations and not also assigned for performance of uplink transmission by the wireless device, such that the wireless device monitors the downlink control channel in subframes being indicated as downlink by at least one of the different uplink-downlink configurations.

* * * * *